United States Patent Office 3,103,499
Patented Sept. 10, 1963

3,103,499
THERMAL STABILIZATION OF OXYMETHYLENE POLYMERS
Thomas J. Dolce, Summit, and Frank M. Berardinelli, South Orange, N.J., assignors to Celanese Corporation of America, New York, N.Y., a corporation of Delaware
No Drawing. Filed Apr. 2, 1959, Ser. No. 803,562
7 Claims. (Cl. 260—45.7)

This invention relates to oxymethylene polymers and particularly to polymers of high initial thermal stability.

Oxymethylene polymers, having recurring —$CH_2O$— units have been known for many years. They may be prepared by the polymerization of anhydrous formaldehyde or by the polymerization of trioxane which is a cyclic trimer of formaldehyde. Oxymethylene polymers vary in thermal stability and in molecular weight, depending on their method of preparation. Oxymethylene homopolymer of exceptionally high molecular weight and stability has been prepared by the repeated sublimation of trioxane from a temperature of 40° to a temperature of —80° C. Exceptionally high molecular weight polyoxymethylene has also been prepared by polymerizing anhydrous formaldehyde in the presence of aliphatic or aromatic primary amines or in the presence of arsines, stibines or phosphines.

High molecular weight polyoxymethylenes may be prepared in high yields and at rapid reaction rates by the use of catalyst comprising boron fluoride coordinate complexes with organic compounds in which oxygen or sulfur is the donor atom, as described in Patent No. 2,989,506 of Hudgin and Berardinelli.

Oxymethylene polymers of even higher thermal stability have been prepared by copolymerizing trioxane with from 0.1 to 15 mol percent of a cyclic ether having at least two adjacent carbon atoms. Copolymers of this type are described in U.S. Patent No. 3,027,352 by Cheves T. Walling, Frank Brown and Kenneth W. Bartz. Such copolymers may be described as having at least one chain containing at least 85 mol percent of oxymethylene (—$OCH_2$—) units interspersed with —O—R— units wherein R is a divalent radical containing at least two carbon atoms directly linked to each other and positioned in the chain between the two valences with any substituent in the R radical being inert.

By the use of techniques which are conducive to the production of polymers of high molecular weight and by the incorporation of comonomers, as described above, it has been possible to produce polymers having oxymethylene groups directly attached to each other which are stable against thermal degradation. By further incorporation of chemical stabilizers it has been possible to stabilize oxymethylene polymers so that their degradation rate at 222° C. is less than about 0.1 weight percent per minute for most of the polymer mass when the polymer is maintained in an open vessel in a circulating air oven at 222° C. However, despite this high stability for most of the polymer mass, it has been difficult to reduce the initial degradation rate of the polymer (at 222° C. in air) to a satisfactory level. It has been found that a polymer may be reduced to a degradation rate (at 222° C. in air) for most of its mass of less than 0.1 weight percent per minute while the initial 0.5 to 20 weight percent of the polymer has a higher degradation rate (at 222° C. in air) of the order of between 1 and 0.5 weight percent per minute. For the purpose of convenience the degradation rate (at 222° C. in air) for most of the polymer mass is hereinafter designated as the "base" degradation rate.

During molding processes, oxymethylene polymers are generally heated to temperatures between about 160° and about 220° C. for relatively short periods between about 5 seconds and about 3 minutes. Even where the base degradation rate (at 222° C. in air) has been reduced to below 0.1 weight percent per minute, it has been found that molded products have uneven surface characteristics, due to gassing, unless the initial degradation rate is also reduced, preferably to below this level. It is an object of this invention to provide a method for reducing the initial degradation rate (at 222° C. in air) of oxymethylene polymers.

In accordance with this invention a method is provided for stabilizing an oxymethylene polymer which has a given rate of initial thermal degradation in terms of percent of weight lost per minute when it is maintained in an open vessel in a circulating air oven at 222° C., which comprises heating said polymer to a temperature above its melting point and below about 60° C. higher than its melting point and maintaining said polymer within said temperature range while permitting the escape of volatile products therefrom until the polymer has an initial thermal degradation rate which is less than 60% of said given rate and thereafter comminuting said polymer to a particulate form.

The melting point is determined by heating a small sample of the polymer on a hot stage to raise its temperature by about 2–3° C. per minute and observing the temperature at which the polymer becomes transparent and flows. The melting point of oxymethylene homopolymers is generally between about 185° and 190° C. Copolymers run somewhat lower in melting point so that a copolymer containing about 2.5% by weight of dioxolane melts at about 165° to 170° C.

In the preferred embodiment of this invention the initial degradation rate (at 222° C. in air) of the polymer which is subjected to the above described treatment is between about 1% and 0.2% weight percent per minute and the base degradation rate (at 222° C. in air) of the polymer is between 0.1 and 0.0 weight percent. After the completion of the treatment, in the preferred embodiment, substantially all of the polymer has a relatively uniform degradation rate which is comparable to the base rate of the polymer before treatment.

Generally the polymer which is subjected to the above described treatment is brought to the desired base degradation rate (at 222° C. in air) by copolymerizing with a cyclic ether and by the addition of chemical stabilizers. Stabilization to reduce the base thermal degradation rate by copolymerization and by the incorporation of chemical stabilizers does not, per se, constitute a part of the invention claimed herein.

The use of the method of this invention is not restricted to any particular chemical stabilizer or stabilizer system. The term "chemical stabilizer," as used herein, is intended to designate any single compound or mixture of compounds which will reduce the base thermal degradation rate of an oxymethylene polymer from a higher rate to a rate not higher than 0.1 weight percent per minute when the polymer is maintained in an open vessel in a circulating air oven at 222° C. The proportion of stabilizer incorporated depends upon the specific stabilizer used. A proportion between about 0.05 and 10 weight percent (based on the weight of polymer) has been found to be suitable for most stabilizers.

One suitable chemical stabilizer is a combination of an antioxidant ingredient, such as a phenolic antioxidant and most suitably a substituted bisphenol, and an ingredient to inhibit chain scission, generally a compound or a polymer containing trivalent nitrogen atoms which are bonded only to carbon and hydrogen atoms. Suitable scission inhibitors include carboxylic polyamides, polyurethanes, substituted polyacrylamides, polyvniyl pyrrolidone and hydrazides.

The chemical stabilizer may be incorporated into the polymer by dissolving both the polymer and the chemical stabilizer in a common solvent and thereafter evaporating the solution to dryness. Alternatively, the chemical stabilizer may be incorporated into the polymer by applying a solution of the chemical stabilizer to finely divided polymer, as in a slurry, and thereafter filtering the polymer and evaporating to dryness.

The most suitable method of incorporating the chemical stabilizer is by blending a dry solid chemical stabilizer into the plastic polymer, while the latter is being kneaded as on heated rolls or through an extruder.

The heating step of this invention is preferably carried out in a system in which a large polymer surface is exposed, or in a system wherein fresh polymer surfaces are continuously exposed. An example of the former is a system wherein the polymer is thinly spread on a large surface, such as on a moving belt. An example of a system in which polymer surfaces are continuously exposed is in the working, or kneading of the polymer on the rolls of a compounding mill, in a dough mixer, such as a Banbury mixer, or through an extruder.

A particularly suitable system for carrying out this invention utilizes the rolls of a compounding mill. The polymer and chemical stabilizer are thoroughly mixed on heated rolls until a uniform admixture is obtained. The mixing action on the heated rolls is then continued with the mass being maintained at the desired temperature while continuously exposing fresh surfaces of the polymer to volatilization, until the desired degree of initial thermal stability is obtained.

The period necessary for heating in order to obtain the desired thermal stability may be estimated from previous experience with similar polymers, similar stabilizing agents and similar proportions. Ordinarily, the heating is continued until between about 0.5 and about 20 weight percent of the polymer is lost. The time necessary for achieving stabilization will ordinarily vary between about 1 minute and about 60 minutes when the polymer is maintained at a temperature between the melting point and about 60° C. above the melting point.

After the heating step is completed the polymer will have conglomerated into a mass which must be comminuted for convenient molding. When the polymer has been treated on cylindrical rolls it is in the form of a sheet upon completion of the treatment and may be conveniently comminuted into pellets by scoring and cutting the sheet. When the polymer has been treated in other apparatus, such as in a dough mixer, it is recovered in the form of large, irregular lumps and is most conveniently sheeted on rolls before being scored and cut.

The comminuted polymer, in the form of pellets passing through a ¼" screen, is in convenient form for molding, including injection molding, extrusion, compression molding and other shaping operations. In some cases, as where a sheet is desired, it may be possible to shape the polymer immediately after the heat treatment step without cooling. In such cases, the comminution step may be omitted. For example, after heat treating a polymer on heated cylindrical rolls for a period sufficient to achieve the desired initial degradation rate, the polymer may then be calendered to a sheet of the desired thickness.

*Example I*

An oxymethylene polymer containing 2.5% by weight of copolymerized dioxolane and having a raw thermal degradation rate of 5.8 weight percent per minute was prepared as follows: 1960.0 g. trioxane, 24.5 g. dioxolane, 852.0 g. cyclohexane and 0.60 ml. $BF_3$ dibutyl-etherate were heated with mixing for 24 minutes at 47–60° C. An additional 24.5 g. dioxolane was added and heating continued on an additional 55 minutes at 59–64° C. The reaction was then cooled to 50° C. and discharged into 3 liters of acetone containing 5 ml. tributylamine, the polymer was filtered off and washed with fresh acetone, and dried at 60–65° C.

*Example II*

The oxymethylene polymer of Example I was blended with 2 weight percent of 4,4' butylidene bis (6-tertiary butyl, 3-methyl phenol) and 5 weight percent of a terpolyamide made up of 38 weight percent of caprolactam, 35 weight percent of hexamethylene adipamide and 27 weight percent of hexamethylene sebacamide. The ingredients were milled at a temperature of 200 to 202° C. in a heated chamber having a pair of parallel counter-rotating screws. The screws were actually substantially cylindrical in shape each having a shallow helical concavity of long pitch. The chamber was heated by the circulation of hot oil through the jacketed walls. After ten minutes the ingredients were uniformly dispersed. This mixture was tested for thermal degradation and showed a degradation of 0.14 for the first 2.5% of the polymer degraded and 0.01 thereafter.

The mixture was worked in the heated chamber for an additional 60 minutes after which the thermal degradation rate was 0.04 weight percent per minute from the very beginning of its degradation.

*Example III*

An oxymethylene polymer containing 2.5% by weight of copolymerized dioxolane and having a raw thermal degradation rate of 4.6 weight percent per minute was prepared in a manner similar to that of Example I except that all of the dioxolane was charged to the reaction initially.

*Example IV*

The oxymethylene polymer of Example III was blended with 2 weight percent of 4,4' butylidene bis (6-tertiary butyl, 3-methyl phenol) and 5 weight percent of Multrathane U–50 (a polyurethane having a melting range of 150°–160° C.). The mixture was milled at 180–182° C. on a pair of heated stainless steel rolls, 6 inches in diameter and 12 inches in length.

After 5 minutes uniform admixture was obtained. The mixture at this stage had a thermal degradation rate of 0.30 weight percent per minute for the first 5% of polymer degraded and 0.15% thereafter.

The mixture was further milled on the rolls for a total period of 24 minutes. At the completion of this milling operation the thermal degradation rate from the very beginning was 0.10 weight percent per minute. The mixture, in the form of a sheet, was cut into 2 inch wide strips while still hot and then chip ground to pass through a ¼" screen.

*Example V*

The oxymethylene polymer of Example III was blended with 5 weight percent of a methoxymethylated nylon (a polyhexamethylene adipamide, treated with methanol and formaldehyde to make it alcohol-soluble) and 2 weight percent of 4,4' butylidene bis (6-tertiary butyl, 3-methyl phenol) in the apparatus of Example II at 200 to 202° C. After 20 minutes a uniform admixture was obtained which had a degradation rate of 0.13 for the first 2% of polymer degraded and 0 thereafter.

After continuing the milling for 45 minutes the degradation rate was 0.02 weight percent per minute from the very beginning.

*Example VI*

An oxymethylene copolymer having 2.5 mol percent of dioxolane incorporated therein and having a raw thermal degradation rate of 2.3 weight percent per minute was stabilized by the application thereto of a 0.3 weight percent solution of sebacic dihydrazide in hot methanol, followed by the evaporation of the solvent. 2 weight percent of sebacic dihydrazide was incorporated into the polymer. A disc molded from this polymer was tested for thermal degradation. The degradation rate was 0.37 for the first 3.5% of the polymer and 0.08 for the remainder of the polymer.

When the unstabilized polymer was blended in the apparatus of Example II at 200° C. with the same proportion of sebacic dihydrazide for a period of 20 minutes the thermal degradation rate was 0.02 weight percent from the very beginning.

*Example VII*

An oxymethylene polymer having 2.5% of dioxolane incorporated therein and having a raw degradation rate of 2.3 weight percent per minute was stabilized with 1% of N-hydroxy methyl polyacrylamide and 1% of 2,2'-methylene-bis (4-methyl-6 tertiary butyl phenol) which were applied to the solid polymer from a combined solution (0.15 weight percent of each) in a water-methanol solvent (equal volumes). After the solvent was evaporated, a disc was molded from the polymer at 190° C. and 1500 pounds per square inch of pressure. The disc had a thermal degradation rate of 0.34 for the first 6% of the polymer and 0.07 thereafter.

When the same stabilizers in the same proportions were incorporated into the same polymer in the apparatus of Example II at 200° C. for 45 minutes the thermal degradation rate from the very beginning was 0.06 weight percent per minute.

*Example VIII*

An oxymethylene polymer containing 2.5% of dioxolane incorporated therein and having a raw thermal degradation rate of 1.3 weight percent per minute was stabilized with 1% by weight of sebacic dihydrazide and 1% by weight of 2,2'-methylene-bis (4-methyl-6-tertiary butyl phenol) which were applied from combined solution in hot methanol (0.15 weight percent of each). After the solvent was evaporated a disc was molded, as described above. The disc had a thermal degradation rate of 0.18 for the first 8% and 0.06 thereafter.

The same stabilizers in the same amounts were incorporated into the polymer on rubber rolls at a temperature of 174° C. After 15 minutes of working on the rolls the polymer had a thermal degradation rate of 0.42 weight percent for the first 4% and 0.07 thereafter. After 30 minutes on the rolls the polymer had degradation rate of 0.10 for the first 2.5% and 0.01 thereafter. After 45 minutes on the rolls the polymer had a thermal degradation rate of 0.05 from the very beginning. The mixture was chip ground, as in Example IV.

*Example IX*

An oxymethylene polymer having 2.5% of dioxolane incorporated therein and having a raw thermal degradation rate of 1.8 weight percent per minute was stabilized with 1 weight percent of malomamide and 1% of 2,2'-methylene-bis (4-methyl-6-tertiary butyl phenol). The stabilizers were incorporated by working on rubber rolls at a temperature of 176-78° C.

After thermal working on the rubber rolls for 15 minutes the polymer had a thermal degradation rate of 0.13 weight percent for the first 2.5% thereof and 0.07 weight percent thereafter. After rolling for 30 minutes the polymer had a thermal degradation rate of 0.09 from the very beginning. After rolling for 45 minutes the polymer had a thermal degradation rate of 0.07 weight percent from the very beginning. The mixture was chip ground as in Example IV.

It is to be understood that the foregoing detailed description is merely given by way of illustration and that many variations may be made therein without departing from the spirit of our invention.

Having described our invention, what we desire to secure by Letters Patent is:

1. Method for stabilizing an oxymethylene copolymer having a melting point of at least 150° C. and having at least one chain containing
    (1) at least 85 mol percent of oxymethylene ($-OCH_2-$) units interspersed with
    (2) $-O-R-$ units wherein R is a divalent radical containing at least two carbon atoms directly linked to each other and positioned in said chain between the two valences, any substituents in said R radical being inert, said method comprising
    (1) heating said copolymer, in admixture with a chemical stabilizer, to a temperature above the melting point of said copolymer but not higher than about 60° C. above said melting point and
    (2) maintaining said copolymer-stabilizer mixture within said temperature range while mechanically working and continuously exposing fresh surfaces of said mixture to permit the escape of volatile products until said mixture has an initial thermal degradation rate which is
        (a) less than 0.1 weight percent per minute and
        (b) less than 60% of the initial degradation rate of an untreated copolymer-stabilizer mixture said degradation rate being stated in terms of weight lost per minute when said mixture is maintained in an open vessel in a circulating air oven at 222° C., the mixture resulting from said treatment being capable of being injection molded.

2. The method of claim 1 wherein said untreated copolymer-stabilizer mixture has an initial degradation rate above 0.1%.

3. The method of claim 2, including the step of thereafter comminuting said copolymer to a particulate form.

4. The method of claim 3 including the step of thereafter molding said copolymer at a temperature between about 160° C. and about 220° C. over a period between about 5 seconds and about 3 minutes.

5. Method for stabilizing an oxymethylene copolymer having a melting point of at least 150° C. and having at least one chain containing
    (1) at least 85 mol percent of oxymethylene ($-OCH_2-$) units interspersed with
    (2) $-O-R-$ units wherein R is a divalent radical containing at least two carbon atoms directly linked to each other and positioned in said chain between the two valences, any substituents in said R radical being inert, said method comprising
    (1) heating said copolymer, in admixture with a chemical stabilizer, to a temperature above the melting point of said copolymer but not higher than about 60° C. above said melting point and
    (2) maintaining said copolymer-stabilizer mixture within said temperature range in a system wherein the polymer is thinly spread on a large surface to permit the escape of volatile products until said mixture has an initial thermal degradation rate which is
        (a) less than 0.1 weight percent per minute and
        (b) less than 60% of the initial degradation of an untreated copolymer-stabilizer mixture said degradation rate being stated in terms of weight lost per minute when said mixture is maintained in an open vessel in a circulating air oven at 222° C., the mixture resulting from said treatment being capable of being injection molded.

6. The method of claim 1 wherein said chemical stabilizer comprises 4,4' butylidene bis (6-tertiary butyl, 3-methyl phenol).

7. The method of claim 1 wherein said chemical stabilizer comprises 2,2' methylene bis (4-methyl, 6-tertiary butyl phenol).

References Cited in the file of this patent

UNITED STATES PATENTS

| | | |
|---|---|---|
| 2,376,354 | Gresham | May 22, 1945 |
| 2,457,224 | Gresham | Dec. 28, 1948 |
| 2,768,994 | MacDonald | Oct. 30, 1956 |
| 2,871,220 | MacDonald | Jan. 27, 1959 |
| 2,989,511 | Schnizer | June 20, 1961 |
| 2,993,025 | Alsup et al. | July 18, 1961 |

FOREIGN PATENTS

| | | |
|---|---|---|
| 1,179,858 | France | Dec. 22, 1958 |
| 748,856 | Great Britain | May 9, 1956 |